Feb. 23, 1937.   G. E. NEWLIN   2,071,422
KITCHEN UTENSIL
Filed Aug. 5, 1935
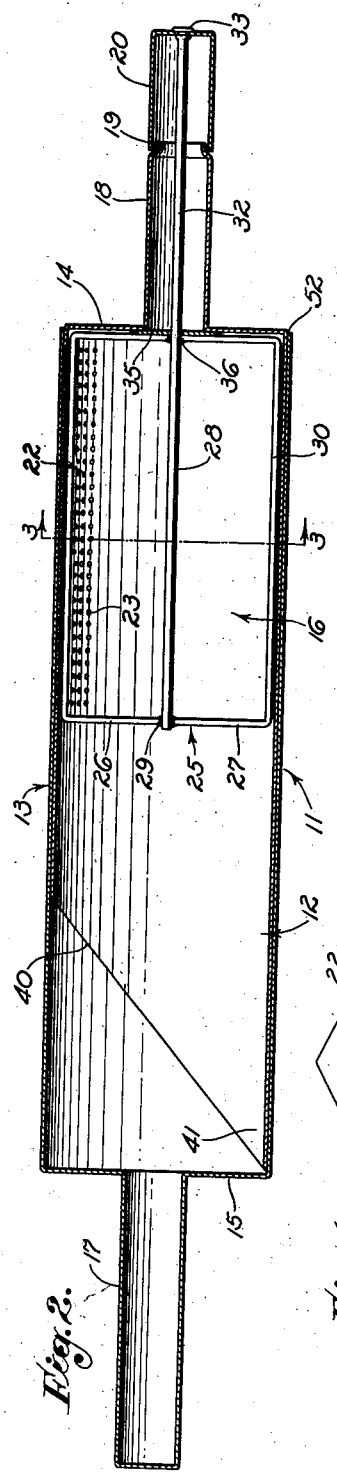
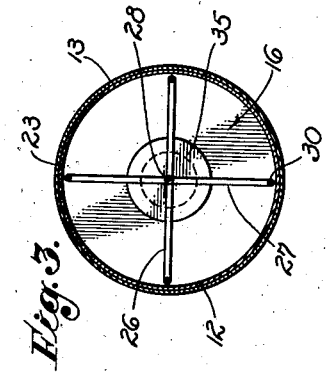
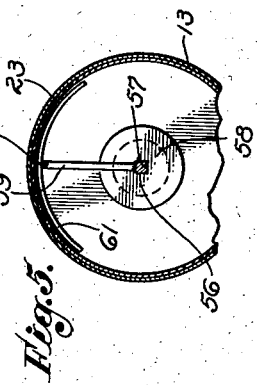
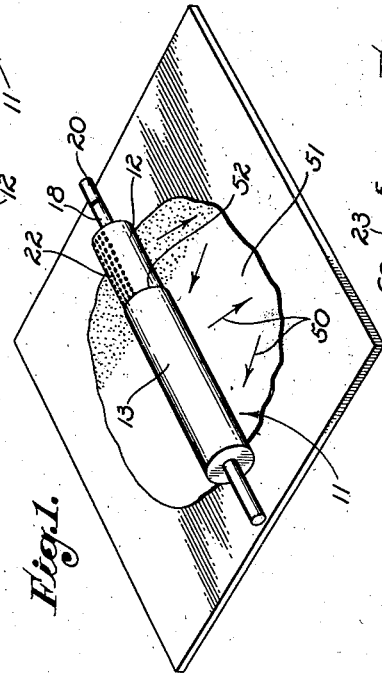
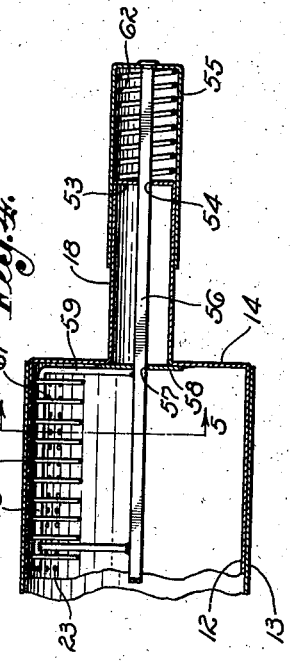
INVENTOR
GEORGE E. NEWLIN
BY
*Ford M. Harris*
ATTORNEY.

Patented Feb. 23, 1937

2,071,422

UNITED STATES PATENT OFFICE 2,071,422

KITCHEN UTENSIL

George E. Newlin, Los Angeles, Calif.

Application August 5, 1935, Serial No. 34,739

2 Claims. (Cl. 107—50)

My invention relates to kitchen utensils, and relates particularly to a novel form of flour sifter in which various elements inherent in the novel structure may be utilized to perform useful functions commonly requiring special utensils.

It is an object of my invention to provide a flour sifter having a telescoping cover for the sifting portion of the sifter, which cover is particularly adapted for use in rolling a surface.

It is another object of the invention to provide a device of the character described in the above paragraph which may be adjusted for rolling a surface and sifting flour on the surface simultaneously. The various elements of the device cooperate in a novel combination in performing this entirely new and useful purpose.

It is another object of my invention to provide a flour sifting and conditioning device in which the parts of the device may be adjusted for rolling a surface, during which operation the flour contained in the flour-containing space of the device is conditioned for subsequent sifting.

It is another object of my invention to provide a device of the character described in which the parts may be adjusted for the purpose of rolling a surface during which time the parts are easily adjusted so that flour may be sifted from the flour-containing space of the device.

It is another object of my invention to provide a flour sifting device having a body suitable for use in rolling a surface which body comprises a pair of telescoping sleeve members cooperating to form a flour-containing space from which flour may be sifted at will by relative adjustment of the telescoping sleeves and a manipulation of the sifting mechanism of the device.

It is another object of my invention to provide a device of the character described in the above paragraph which includes in a novel combination a means for quickly and easily filling the flour-containing space of the device.

These and other objects of the invention as well as other novel functions which may be accomplished by certain parts of the novel combination will be more fully explained in the following specification with reference to the accompanying illustrative drawing and the appended claims.

In the drawing,

Fig. 1 is a utility view illustrating one of the novel functions which the device performs.

Fig. 2 is a longitudinal section through the device taken on a median plane.

Fig. 3 is a vertical section taken as indicated by the line 3—3 of Fig. 2.

Fig. 4 is a fragmentary sectional view illustrating an alternative form of agitating means operable to assist in effecting a sifting of a substance such as flour and the like.

Fig. 5 is a fragmentary vertical section taken as indicated by the line 5—5 of Fig. 4.

With reference to the first form of the invention disclosed in Figs. 2 and 3, I show my novel sifting device as including a preferably cylindrical body 11 comprising inner and outer sleeve members 12 and 13 associated in telescoping relation substantially in the manner shown.

Each of the sleeve members 12 and 13 is provided with an outer end wall characterized 14 and 15, respectively, these walls cooperating with the cylindrical walls of the sleeve members to provide a flour-containing space 16.

The outer sleeve member 13 is provided with an axially extending grasping member or handle 17 which, in the preferred form of the invention, is formed integrally with the body portion of the sleeve, such, for instance, as by drawing the material of the end wall 15 substantially in the manner shown.

The inner sleeve member 12 is provided with an axially extending grasping member or handle 18 preferably formed integrally with the end wall 14 in a manner similar to the handle 17 of the outer sleeve. In this form of the invention the handle 18 is terminated in a reduced diameter portion 19 which serves as a journalling member for an outer section or knob 20, which portion of the handle 18 is rotatable relative to the main portion of the handle 18 and the sleeve 12 as and for a purpose which will be described hereinafter.

Formed in the wall of the body portion of the sleeve 12 is a sifting means 22 preferably comprising a series of closely related perforations 23. These perforations 23, in the preferred form of my invention, extend longitudinally as shown in Fig. 2 from a point closely adjacent the end wall 14 for a considerable portion of the length of the sleeve 12, and, as best shown in Fig. 3, extend for only a portion of the circumference of the sleeve 12. It should be understood, however, that the sifting means 22 might readily extend the entire circumference of the inner sleeve without changing the primary function of the device.

It should also be understood that my invention contemplates other forms of sifting means which might embody a longitudinally extending opening formed in the sleeve 12 and having a covering of screen wire or the like capable of sifting a substance such as flour.

Positioned within the inner sleeve 12 is an agitating member 25 supported in movable relationship with the wall of the sleeve and adapted to accomplish a novel result in combination with certain elements of the device, which will be fully described hereinafter.

In this form of the invention I prefer to mount the agitating device 25 in rotatable relationship with the sleeve 12. The agitating device 25 comprises a frame 26 formed by securing a plurality of U-shaped wires 27 to a central rod 28 as by welding or soldering, as indicated at 29 of Fig. 2. The U-shaped wires 27 are preferably four in number and are spaced in right-angled relationship, as best indicated in Fig. 3. The outer portions 30 of the wires 27 are disposed relatively close to the inner wall of the sleeve 12 and extend longitudinally a sufficient distance so that the portions 30 of the wires 27 sweep across the entire area of the perforated portion or sifting means 22 when the agitating means is rotated in the space 16.

The central rod or shaft 28 is provided with an extension or shaft 32 which extends axially through the handle 18 and is secured in any suitable manner such as by riveting or welding to the rotatable section or knob 20 of the handle 18 as indicated at 33. A bearing plate 35 having a central opening 36 is secured to the end wall 14 of the shell, the shaft 32 extending through and being journalled by the opening 36 substantially in the manner shown in Fig. 2.

In use my novel utensil performs a number of functions and accomplishes a number of useful results, and by simultaneously performing certain functions accomplishes results never before contemplated in the art.

In operation the telescoping sleeves 12 and 13 may be separated and the flour-containing space 16 filled with flour or the like. This is accomplished by grasping the handle 18 and scooping the flour into the interior of the sleeve 12. It is preferable to cut the inner open end of the sleeve 12 diagonally, as indicated at 40 of Fig. 2, which provides a segmental extension 41 on the periphery of the inner open end of the sleeve to assist in scooping the flour or other material into the space 16. The extension 41 is preferably on the side of the sleeve opposite to the side wall in which the perforations 23 are formed in the manner shown in Fig. 2.

When the space 16 of the sleeve 12 has been filled the outer sleeve 13 is telescoped over the inner sleeve to completely cover the sifting means 22. With the parts adjusted in this relationship the utensil may be used to roll a surface or as a crushing device.

When it is desired to sift flour or the like over a surface the telescoping sleeves may be extended either partially or completely and the flour sifted as desired over the surface by rotating the knob 20 rapidly in alternate directions so that one or more of the U-shaped wires 27 of the agitating frame 26 sweeps back and forth across the perforated portion 23.

The manipulation of the agitator 25 in the above described manner is not necessary to effect a sifting of the flour, for the reason that the device may be simply shaken to sift the flour through the perforations.

If it is desired to sift flour over a surface at the same time that the surface is being rolled, such, for instance, as in the preparation of pastry dough, the telescoping sleeves may be partially or wholly extended in a manner indicated in Fig. 1, so that the outer sleeve 13 when it is rolled back and forth, as indicated by the arrows 50, performs the function of rolling a layer of pastry dough 51, and at the same time that the rolling operation is being performed the sifting means 22 sifts a thin layer of flour or the like over the surface of the pastry dough.

This operation is best performed by grasping the handles 17 and 18 lightly so that as the device is rolled backward and forward the handles slip in the hands. The knob 20 at the same time may be grasped more firmly so that rotation thereof with the body of the device is prevented, with the result that the relative movement between the agitator 25 and the wall of the sleeve 12 is effected to assist in causing the flour to be sifted through the perforations 23.

My invention embraces another novel function never before contemplated in conditioning flour or the like for use in the preparation of pastry dough and results in a considerable saving of time.

In the performance of this function, the space 16 may be filled with flour or other material and the telescoping members or sleeves 12 and 13 completely closed and the device used to roll a surface or used as a crushing means as desired while at the same time grasping the rotatable section of the handle 18 as above described, which results in a thorough agitation of the flour to break up any portions thereof that might be closely packed, thus affording a thorough conditioning of the flour while performing other tasks in the preparation of pastry without the usual repeated sifting of the flour to condition it for use as an ingredient of the pastry being prepared.

It will thus be seen that my invention comprises a novel combination of parts having an entirely new mode of operation and is capable of accomplishing new as well as practical results.

Another feature of my device is that the outer open end 52 of the outer sleeve 13 is particularly adapted for use in cutting dough, such as biscuits and the like.

Referring to the alternative form of agitating means illustrated in Figs. 4 and 5, the handle 18 of the inner sleeve 12 is preferably provided with a closed outer end 53 having a squared opening 54 therein. Slidably positioned over the handle 18 is a movable section in the form of a cup 55. Fixedly secured to the cup 55 is a squared shaft 56 which slidably extends through the opening 54 and also extends through a squared opening 57 provided in a plate 58 secured to the end wall 14 of the sleeve 12 in a manner similar to the plate 35 of the previously described form. Secured to the shaft 56 is a plurality of vertically extending wires 59 which are in turn secured together at the upper ends thereof by a longitudinally extending wire 60 which centrally supports a plurality of segments 61 formed of arcuate pieces of wire extending laterally across the perforated portion 23 as shown in Fig. 5. Confined between the outer end wall 53 of the handle and the cup 55 is a compression spring 62. It will be clear that the agitating member of this form of the invention is adapted for longitudinal reciprocation in the space 16 adjacent the sifting means so that the segments 61 sweep back and forth across the perforations 23 to assist in effecting a sifting of the flour therethrough.

Although I have disclosed and described my invention in simple form, it should be understood that various features thereof might be changed and various embodiments might be devised which are fully capable of performing the novel combination of functions and accomplish the new results inherent in my novel combination without avoiding the scope of equivalents to which this invention is entitled. Therefore, the true scope of my invention should only be interpreted by the appended claims.

I claim as my invention:

1. In a device of the character described, the combination of: a telescoping body comprising an inner and an outer sleeve having closed outer ends on which are fixed axial handles, the inner open end of said inner sleeve being shaped to comprise a scoop and said sleeves cooperating when together to provide a flour containing space; perforations formed in the upper side wall of said scoop normally closed by said outer sleeve; an agitator operable exclusively within said scoop said agitator including a shaft journalled in the outer end wall of said scoop and extending through said handle thereof; and an operating member journalled on the outer end of said handle of said scoop and fixed to said shaft whereby said agitator may be held stationary relative to said body when said body is rolled over a surface or said agitator may be rotated relative to said body when said sleeves are extended to assist in sifting flour through said perforations.

2. In a device of the character described, the combination of: a telescoping body comprising an inner and an outer sleeve having closed outer ends on which are fixed axial handles, the inner open end of said inner sleeve being shaped to comprise a scoop and said sleeves cooperating when together to provide a flour containing space; perforations formed in the upper side wall of said scoop normally closed by said outer sleeve; an agitator operable exclusively within said scoop said agitator including a shaft journalled axially in said handle of said scoop; and an operating member rotatable relative to said handle and fixed to said shaft whereby said agitator may be held stationary relative to said body when said body is rolled over a surface or said agitator may be rotated when said scoop is partly extended or fully separated from said outer sleeve to assist in sifting flour through said perforations.

GEORGE E. NEWLIN.